US009967322B2

(12) United States Patent
Coulmeau et al.

(10) Patent No.: US 9,967,322 B2
(45) Date of Patent: May 8, 2018

(54) METHOD FOR THE EXECUTION OF SERVICES IN REAL TIME FLIGHT MANAGEMENT SYSTEM

(71) Applicant: THALES, Courbevoie (FR)

(72) Inventors: Francois Coulmeau, Toulouse (FR); Laurent Castet, Toulouse (FR); Laurent Deweerdt, Toulouse (FR); Frederic Sanchez, Toulouse (FR)

(73) Assignee: THALES, Courbevoie (FR)

( * ) Notice: Subject to any disclaimer, the term of this patent is extended or adjusted under 35 U.S.C. 154(b) by 257 days.

(21) Appl. No.: 14/696,132

(22) Filed: Apr. 24, 2015

(65) Prior Publication Data
US 2015/0334173 A1 Nov. 19, 2015

(30) Foreign Application Priority Data
May 16, 2014 (FR) .................................... 14 01108

(51) Int. Cl.
*H04L 29/08* (2006.01)
*G06F 9/48* (2006.01)
*H04L 29/06* (2006.01)

(52) U.S. Cl.
CPC ............ *H04L 67/10* (2013.01); *G06F 9/4881* (2013.01); *G06F 9/4887* (2013.01); *H04L 67/42* (2013.01)

(58) Field of Classification Search
None
See application file for complete search history.

(56) References Cited

U.S. PATENT DOCUMENTS

| 7,207,045 | B2 * | 4/2007 | Goiffon | G06F 9/4843 |
| | | | | 701/120 |
| 8,214,075 | B2 * | 7/2012 | Griffin | G06Q 10/047 |
| | | | | 343/757 |
| 8,321,558 | B1 * | 11/2012 | Sirota | G06F 9/5011 |
| | | | | 709/201 |
| 8,924,976 | B2 * | 12/2014 | Park | G06F 9/4887 |
| | | | | 718/100 |
| 9,639,401 | B1 * | 5/2017 | Bertram | G06F 9/5038 |

(Continued)

OTHER PUBLICATIONS

Tarek F. Abdelzaher, et al., "QoS Negotiation in Real-Time Systems and Its Application to Automated Flight Control", Real-Time Technology and Applications Symposium, Jun. 9-11, 1997, pp. 228-238, IEEE, USA, XP010232482.

*Primary Examiner* — Abu Zar Ghaffari
(74) *Attorney, Agent, or Firm* — Baker & Hostetler LLP

(57) ABSTRACT

A system executes services by a "server" for a "client". A preliminary step establishes a list of available services of the server, set up for the client, in which a processing time is determined releasable by the server for the client per code execution cycle minor frame ("MIF"). The system creates on start-up: NT execution tasks for the client, each having a priority of execution level and an allocated average duration of execution, a number of execution tasks (NT) being at least 1, the sum of durations of the tasks being at most the releasable processing time; execution rules associating each of the tasks with at least one service of the list; then, during each MIF cycle, the system executes the services on their associated tasks, a task executed by priority and for at most its allocated average time of execution, the non-executed part of a service being executed on its associated task in the next cycle.

16 Claims, 9 Drawing Sheets

(56) References Cited

U.S. PATENT DOCUMENTS

| | | | |
|---|---|---|---|
| 2002/0120663 A1* | 8/2002 | Binns | G06F 9/4887 718/103 |
| 2004/0078614 A1* | 4/2004 | Toillon | G06F 1/12 713/500 |
| 2006/0218558 A1* | 9/2006 | Torii | G06F 9/4887 718/107 |
| 2008/0140829 A1* | 6/2008 | Berbiguier | G06F 11/2023 709/224 |
| 2010/0043001 A1* | 2/2010 | Stolpe | G06F 9/4881 718/102 |
| 2010/0333102 A1* | 12/2010 | Balasubramanian | G05B 19/0421 718/103 |
| 2011/0258630 A1* | 10/2011 | Fee | G06F 9/4843 718/101 |
| 2012/0079486 A1* | 3/2012 | Brandt | G06F 9/4887 718/102 |
| 2013/0036421 A1* | 2/2013 | Miller | G06F 9/4887 718/102 |
| 2013/0219402 A1* | 8/2013 | Andrianiaina | G05B 19/0426 718/104 |
| 2014/0201362 A1* | 7/2014 | Radhakrishnan | H04L 67/322 709/224 |

* cited by examiner

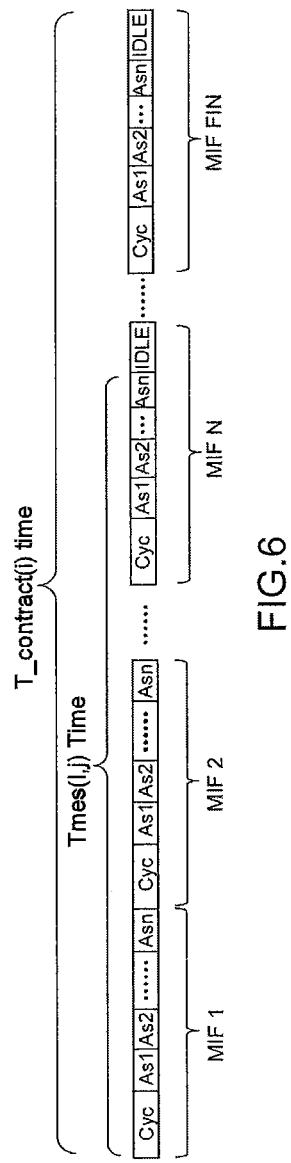
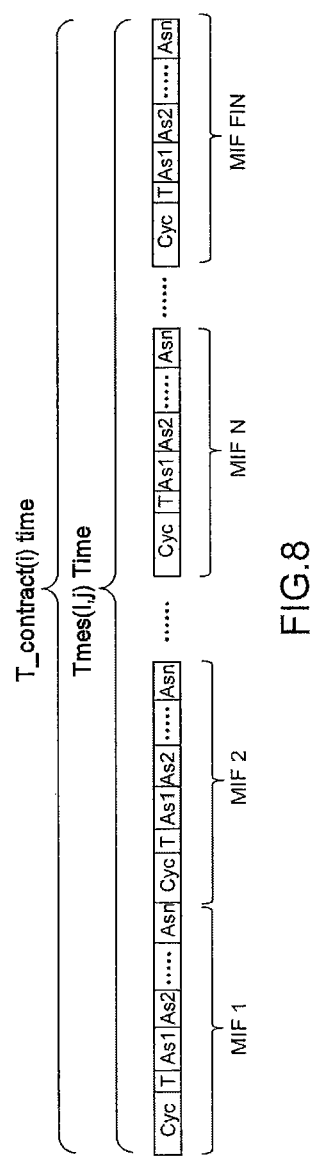

METHOD FOR THE EXECUTION OF SERVICES IN REAL TIME FLIGHT MANAGEMENT SYSTEM

CROSS-REFERENCE TO RELATED APPLICATION

This application claims priority to foreign French patent application No. FR 1401108, filed on May 16, 2014, the disclosure of which is incorporated by reference in its entirety.

FIELD OF THE INVENTION

The present invention relates to a method for the execution of services, notably of flight management, and to a system using such a method.

The invention is notably applicable in onboard systems and more particularly in avionic systems.

BACKGROUND

Each real time avionic system is architectured and developed to meet performance requirements (notably failure rate and quality of service) in a defined field of use. Each system, connected to other systems, consumes data and services made available by the other systems and produces data of services for the other systems. These interactions are generally set statically during the production of the overall architecture of the "system of systems", that is to say during the allocation of operational functions to the physical systems. Thus, it is frequent in avionics to have several dozen systems responding to all of the aircraft functions. Typically, the aircraft operations are allocated to the systems according to a logical structure, defined in the standardizing document of the ATA (Air Transport Association). The aircraft architecture therefore breaks down into collaborative avionic systems, each one having a well defined function, and interactions with the other systems in order to provide the expected operational service. The different functions are distributed over several physical computers, as chosen by the aircraft manufacturers, in order to guarantee the performance of the missions.

The onboard systems are qualified, with a demonstrated level of performance, for a given environment. The interactions between systems are defined a priori when the aircraft architecture is generated, and the systems are developed and adjusted to meet the strict interaction requirement.

From the "client-server" point of view, where all of the systems called "client" produce requests to a particular system called "server", the task of the manufacturers who develop the functions allocated to the "server" is to guarantee that the final performances of the latter will conform with the expected performances and will do so in the field of use defined a priori.

In this field defined a priori, all of the clients are known and well identified; no new client can interact with the system without requalification of the whole of the system.

A major problem is that the addition of a new client to a given system gives rise to a very costly requalification. In fact it is necessary to demonstrate again the maintaining of the operational performance of the whole of the "server" system, even when no new service is expected by the "server" system. This restricts the evolution of aircraft operations.

There is therefore a need to be able to allow the addition of new connections and of new clients to a real time "server" system, guaranteeing for them a quality of service and a response time that does not degrade its performance and does not give rise to software or hardware modifications of the "server". In this case, the addition of a new client or of a new connection would give rise only to a qualification of the client in question and to a demonstration proving that the performance of the overall system remains in conformity with the required requirements.

SUMMARY OF THE INVENTION

A purpose of the invention is notably to meet this need. For this purpose the invention relates to a method for the execution of services in real time by an application called "server" for at least one application called "client", a preliminary step establishing a list of services of the server available for the said at least one client, in which step there is determined a processing time releasable by the server for the said at least one client per code execution cycle called a minor frame ("MIF"), the said method creating on start-up:

a number of execution tasks (NTS client tasks (Task(i)) for the said at least one client each one having a priority of execution level (P_task(i)) and an allocated average duration of execution (T_task(i)), NT being equal to or greater than 1, the sum of the durations of the said tasks being less than or equal to the said releasable processing time;

execution rules associating each of the said tasks (Task(i)) with at least one service (Serv(k)) of the said list;

then, during each MIF cycle, the said method executes the said services on their associated tasks, a task being executed according to its level of priority and for a time at most equal to its allocated average time of execution (T_task(i)), the non-executed part of a service being executed after the intrinsic tasks of the server.

During each MIF cycle, the said client tasks are for example executed after the high priority tasks of the server and before the intrinsic tasks of the server.

If the number of clients is greater than 1, a task (Task(1)) supervises for example the asynchronous requests sent by the clients and initiates the processings of associated services on the server, either on this same task (Task(1)), or on a task of different priority, as a function of the available time of the server within a MIF cycle.

In one possible implementation, the method determines the maximum time necessary for executing a service of the server for a client on an associated task, knowing its average processing time per cycle, the said maximum time being transmitted to the said client.

As a maximum time of execution is imposed, the execution of a service is for example accepted or refused as a function of the maximum time necessary for completing the execution of the said service and of the imposed maximum time of execution, the imposed maximum time of execution being able to be provided by the client requesting the said service. The said imposed maximum time of execution is for example predetermined by configuration of the server.

The average time of execution allocated per MIF cycle (T_task(i)), is for example defined individually for each client, whatever the associated service may be. A task (task(i)) is for example defined for each service. A task (task(i)) is for example defined for each client.

The average time of execution allocated per MIF cycle is for example variable as a function of the server's own execution needs.

The average time of execution allocated per MIF cycle is for example variable as a function of the time remaining for the server to execute an internal service, the said service not being on the said list, and of the expected response time for the said service.

The releasable processing time is for example equal to $a \cdot T_{Idleopt} - b$, where a is a coefficient of between 0 and 1 and b is a time margin, $T_{Idleopt}$ being the average duration of the free time remaining per MIF cycle making it possible to keep to the response times of the intrinsic tasks of the server with a predefined probability. In a particular implementation a=1 and b=0.

The said available services are for example advantageously structured with the help of an abstract syntax making it possible to put the data of the server and of the said available services in parameter form.

The invention also relates to a real time system implementing the previously described method, comprising at least a physical module in which the server is installed, the clients being external applications installed in the said physical module, the said clients communicating with the server via a memory inside the module.

The clients are for example external applications distributed in other physical modules and communicating with the server via a network protocol. The server is for example a flight management application, the clients interacting with the flight management application.

BRIEF DESCRIPTION OF THE DRAWINGS

Other features and advantages of the invention will become apparent with the help of the following description, given with reference to the appended drawings in which:

FIG. 6 shows the result of a measurement to determine the aforesaid average duration;

FIG. 8 shows a theoretical distribution of the average duration of the time remaining over all of the code execution cycles;

DETAILED DESCRIPTION

Figure 1:
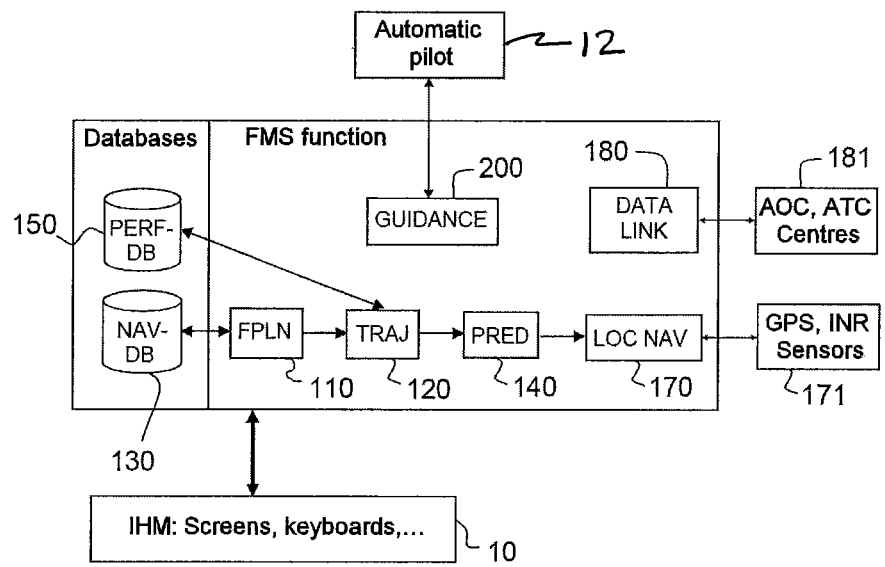
FIG. 1 is a presentation of the functional architecture of an onboard flight management system.

FIG. 1 shows the functional architecture of an onboard flight management system, known as FMS (Flight Management System). This well known standard architecture meets the ARINC 702A standard. One of the functions of the FMS is to locate the aircraft by using its sensors 171 (inertial systems, GPS and radio beacons notably). This function is carried out by a locating module 170. The system comprises the following functions and components:

A flight function FPLN 110, for entering the geographic elements constituting the skeleton of the route to follow (departure and arrival procedure, waypoints . . . );

A navigation database NAVDB 130, for constructing geographic routes and procedures on the basis of data contained in the bases (points, beacons, interception or altitude legs . . . );

A performance database, PRF DB 150, containing the aerodynamic and engine parameters of the aircraft;

A lateral trajectory function TRAJ, 120: for constructing a continuous trajectory from the points of the flight plan, complying with the performance of the aircraft and the confinement constraints (RNP);

A prediction function PRED, 140: for constructing an optimized vertical profile on the lateral trajectory;

A guidance function, GUID 200, for guiding the aircraft in the lateral and vertical planes on its 3D trajectory, whilst optimizing its speed;

Digital data link DATALINK, 180 for communicating with the control centres 181 and other aircraft.

From the geographic information contained in the navigation database 130, the pilot can construct his route, called "flight plan" and comprising the list of points passed through called "waypoints", this function being provided by the flight plan function 110. The FMS can manage several flight plans. One of them, known by the acronym "Active" in ARINC 702A denotes the flight plan on which the aircraft is guided. There are working flight plans, sometimes called "secondary flight plans" or "inactive" flight plans, as well as transient flight plans.

The function 120 calculates the lateral trajectory as a function of the geometry between the waypoints, commonly called LEG, and/or the altitude and speed conditions that are used for calculating the turn radius.

On this lateral trajectory, the FMS optimizes a vertical trajectory, in altitude and speed, passing through possible constraints of altitude, speed and time, using a modelling of the aerodynamic and engine performances contained in the performance database 150.

Knowing the location of the aircraft and the 3D trajectory, the FMS can lock the aircraft onto this trajectory, this locking being carried out by the guidance function 200. All of the information entered or calculated by the FMS is grouped on display screens or other IHM 10. Communication with the ground, notably with the airline company and with air traffic control, is carried out through the digital data link 180.

In FMS terminology, the term "revision" is used to characterize an insertion, modification or deletion of data in the FMS system, the word "editing" is sometimes used.

In current architectures (whatever the aircraft may be), the "Flight Planning" and "optimized trajectory" part is generally included in a dedicated computer called "FMS", standing for "Flight Management System" (or flight management computer). These functions constitute the core of FM technology.

This system can also host a part of the "Location" and of the "Guidance".

In order to carry out its mission, the FMS is connected to numerous other computers (about a hundred).

Two big clients habitually interact with the FMS system:

The Man Machine Interface (called HMI, standing for "Human Machine Interface") which allows operators (the crew) to interact with the FMS The CMU (Communication Management Unit) interface which allows a ground operator (airline company, air traffic control) to interact with the FMS: This CMU computer is a client for the FMS data and can request modification of the mission (i.e. insert "revisions" in the FMS)

The term "interaction" means a "request" sent to the FMS, with an expected return, as opposed to "information" which consists in third party systems subscribing to the data transmitted periodically or on an event basis by the FMS.

The future operations of the aircraft will however necessitate third party systems interacting with the FMS, that is to say:

Using existing public services
Using existing private services
Using new services to be implemented in the FMS.
The following can be mentioned for example:
Initialization of the FMS flight plan by an external computer (touch tablet, iPad, EFB standing for "Electronic Flight Bag")

Integration of the "flight plan" of the FMS with the "taxiing plan" of the taxiing computer (called ANF for Airport Navigation Function, AOF for Airport Onboard Function or TAXI or AMM pour Airport Moving Map)

Optimizing the mission, called for by a ground client (company tool for example) or onboard client (tablet, EFB) via requests for FMS calculation Updating the FMS software (in particular its Navigation databases, with a 28-day cycle) by a third party equipment (tablet, maintenance tool, EFB)

Utilisation of FMS requests by a system for surveillance of the terrain, of the traffic, of meteorological conditions for filtering warnings, or confirming them, or for optimizing lateral and vertical adjustments (for example: avoiding a moving cloud mass detected by a Meteorological Radar)

The traffic surveillance system is known by the acronym TCAS (Traffic Collision Avoidance System) or Traffic Computer The terrain surveillance system is known by the acronym TAWS (Terrain Avoidance Warning System) or GPWS (Ground Proximity warning system)

The meteorological surveillance system is known by the acronym WxR (Weather Radar)

Utilisation of FMS requests to assist the triggering of events on a third party system (for example: Modification of the radio frequency by the RMS (Radio Management System) system when approaching a change of region point.

Checking the conformity of the lateral and/or vertical trajectory calculated by the FMS, with respect to digitized aeronautical maps provided to the crew (stored in a tablet, an EFB for example).

Utilisation of the FMS system to know predictions over a given timescale according to defined flight management modes (guidance) and aircraft status (for example: an Automatic pilot 12 wishing to know the average climb rate over 2000 feet of altitude change with 1 failed engine; fuel computer wishing to compare the average consumption with the FMS consumption predictions . . . ).

Interactions with the FWS (Flight Warning System) for presenting the results of checks, proposing automated DO LIST initiations, directly modifying FMS statuses on confirmation of failures.

Passengers, connected via their cabin interface (IFE pour In Flight Entertainment), wishing to know weather and speed predictions for their destination.

Utilisation of the FMS via an AID (Domain Interaction Agent) or an integrated IHS (Human System Interface) which concentrates and organises the exchanges between computers.

Thus, about ten new clients are likely to interact with the FMS (EFB, WIMS, TCAS, TAWS, WxR, PA, FQMS, IFE); in brief, most of the systems of the different ATA. In the future, it is possible that an even greater number of clients will wish to interact with the "flight management".

However, the rate of requests from different systems is not known a priori, neither is the time at which the request will be made, nor the volume of data that this represents.

If the third party systems wish to store the calculation results for future use, the number of requests of this type is not known a priori.

If a new system is connected, its intentions (type of requests, frequency) are not known a priori.

The method according to the invention, described below, by making the architecture of the system more open, allows the addition of these new clients with an unknown number of requests arriving at random times, and it does so whilst guaranteeing the intrinsic performances of the system.

The invention is described for an avionic system but it is applicable to any real time onboard system architecture.

Figure 2A:
FIGS. 2a and 2b show operational features of real time systems.
Figure 2B:
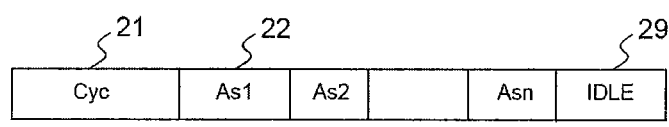

FIGS. 2a and 2b show operational features of these systems. FIG. 2a shows a frame executed by each processor of a computer, this frame being known by the term a minor frame ("MIF"). More particularly, each processor executes its code over successive time slots, these slots being MIFs. Each MIF is divided statically or dynamically, depending on the technologies, into time partitions, that is to say into time slots 20 during which a function is executed. In the example shown in FIG. 2a, the MIF comprises N slots P1, P2, P3 . . . PN.

This technology is widely used in so-called IMA (Integrated Modular Avionics) in aeronautics. It makes it possible to host several functions in a common computer resulting in weight and electrical power savings.

In most real time onboard systems, the partitioning is static in order to ensure the determinism of the overall response times of the system. In the same way, the IMA modules allocate, generally statically, the physical RAM and ROM memories that each function will use. This makes it possible to correctly segregate the different functions which are executed within a common module and to have better control over failure problems.

FIG. 2b illustrates the real time execution of a real time function at the level of a partition of a MIF. FIG. 2b shows a succession of processings 22 arranged in order of priority, the processing As2 being able to be executed before the processing As1 but being able to be interrupted by As1 which takes over because its priority is higher, and similarly for Asi−1 with respect to Asi. In general, the system begins by executing the processings 21 of the function called "cyclic". This is processing that has to be executed in each MIF without being interrupted, these processings notably relating to input and output management or to the calculation of information that must be refreshed in each cycle. These processings have a higher priority because it is necessary to guarantee that they will always have the time to be executed. These are in fact tasks like the others but are ones that have generally been given a high priority in order to guarantee that they take place before the other processings.

After the cyclic processing 21, come the asynchronous processings 22. In real time, these are processing that are executed on request (events, periodic wakeup . . . ). The events are generally generated by the peripheral systems connected to the main system. They are arranged in order of processing priority. Thus, in FIG. 2b, a succession of asynchronous processings 22 is shown, the event As1 being followed by the event As2, which is followed by the event As3 and so on until the last event Asn. If P(Asi) denotes the priority of an event, then:

$$P(As1) > P(As2) > P(As3) > \ldots P(Asn).$$

If the first processing As1 necessitates all of the calculating time remaining in the MIF, the other processing will only be able to be executed at best in the following MIF. If the sum of the cyclic 21 and asynchronous 22 processings having to be executed does not exceed the duration of the MIF then free time 29 remains, which is called IDLE.

The response times perceived outside of the system, that is to say perceived by the peripheral systems or by humans, for a given overall processing, are therefore proportional to the number of MIFs necessary to execute the totality of the processing. Thus, over an MIF of 80 ms where the cyclic processing takes 30 ms, if a processing necessitates 1 second of processor time to execute its calculation, at best 20 MIF will be necessary in order to complete it, 20 MIF corresponding to 20×50 ms=1 second where 50 ms is the time remaining in an MIF after the 30 ms of cyclic processing. The response time will therefore be 20×80 ms=1.6 seconds. If the processing becomes concurrent with other asynchronous processings having higher priority than itself, the number of MIFs necessary increases and therefore so does the response time perceived from the exterior.

Notably, this shows that the whole of the difficulty for manufacturers in this field in building a real time architecture is to sequence the processing over tasks having priorities adapted to keep to all of the required response times, taking account of the concurrence of the processings with a maintained probability of compliance. In general, the systems must guarantee that they maintain their performance requirements 100% of the time as "mono-events", that is to say without superimposition of concurrent events. Moreover, the probability that this is no longer the case for concurrent "multi-events" is measured, this probability having to be as low as possible. It can thus be required that the system is designed to keep to all of the response times 99% of the time. This probability can also be different from treatment to treatment depending on their criticality, that is to say according to their impact on the overall compliance of the operation.

When the number of clients able to request an asynchronous processing, the maximum frequency of their requests and the CPU computation duration corresponding to the processing of the requests by the server are known, there are various techniques known in the prior art for creating and sequencing the real time tasks of a given resource in order to meet these response time requirements with the required probability.

The invention advantageously uses a dynamic task priority mechanism as described above, using the measured average free time, that is to say the average "IDLE" time.

It is of course necessary that the free time 29 exists, that is to say that the system has not just sufficient time but that is should have a margin. This is in fact the case for most real time systems because the performance requirements to be met are difficult to measure a priori, the intrinsic performances of a system being difficult to measure a priori. It follows that the systems are in practice a little overdesigned in order to allow for hazards and risks.

This margin corresponds to the average remaining time 29, that is to say to the average duration of the IDLE, when system performance is measured over a wide range of computing load scenarios.

This average remaining time can be:
  Measured by test campaigns, for worst cases of event superimposition or by bulk random tests using Monte-Carlo techniques, other types of tests being possible;
  Quantified by models conforming with the real time point of view, the MBDE (Model Based Driven Engineering) tools sometimes offering performance calculation functions;
  Measured by results of functional operation tests.

It is thus possible to determine, knowing the system in its field of use, with its determined number of clients, the variables M(IDLE) and P(IDLE) respectively corresponding to the average and the variance of the duration of the IDLE task, that is to say of the remaining time 29.

Figure 3:
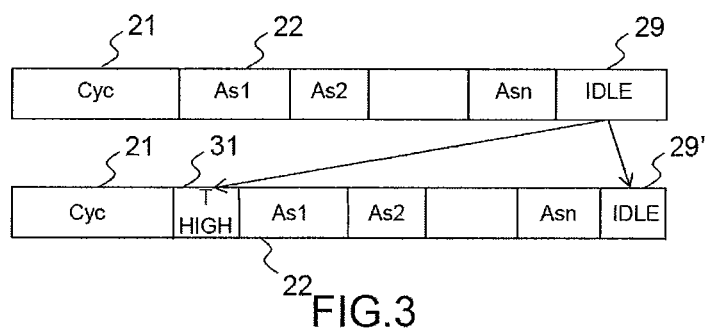
FIG. 3 illustrates the principle of the invention.

FIG. 3 illustrates the principle of the invention. According to the invention there is determined an optimized average duration of the IDLE 29 called $T_{IdleOpt}$ the value of which makes it possible to keep to the response times with the required probability. The system then allocates to the external clients a time slot on a new high priority task 31 the duration of which does not exceed the duration $T_{IdleOpt}$ on a given resource. The new remaining time 29' becomes less than the remaining time 29 without introduction of this task 31, or even zero.

An external client is a client not foreseen in the production of the architecture, that is to say a new client, not known a priori.

The invention thus makes it possible, knowing this duration $T_{IdleOpt}$, and knowing the average duration CPU of an individual processing 21, 22 among the proposed services, and the state of the stack of requests being processed and waiting, to estimate the time at which the server will be able to respond to the client. This notably makes it possible to have strategies of refusal and acceptance of requests according to the due times requested by the clients.

Variant implementations are possible, in particular:
  N tasks can be created rather than a single task, N therefore being greater than 1, with different priorities and execution times, in order to distribute the services whose computing time or importance differ. These N tasks are executed after the cyclic processing 21, for example between the cyclic processing and the first asynchronous processing As1 (FIG. 3 illustrates the case where N=1);
  The N tasks can be distributed over several resources, that is to say over several instances of execution of the server system, typically in the case of systems having redundancy. A supervision system must be set up to allocate the client requests to the different physical instances in order to optimize the overall load.

It should be noted that, in terms of implementation, in an onboard avionic system, the ARINC 653 standard, a real time task can be executed partly with a given priority and partly with another priority, the standard in fact making it possible to allocate a task according to a "base priority" and a "current priority". Other types of implementation are of course possible, particularly in non-avionic fields.

Figure 4:
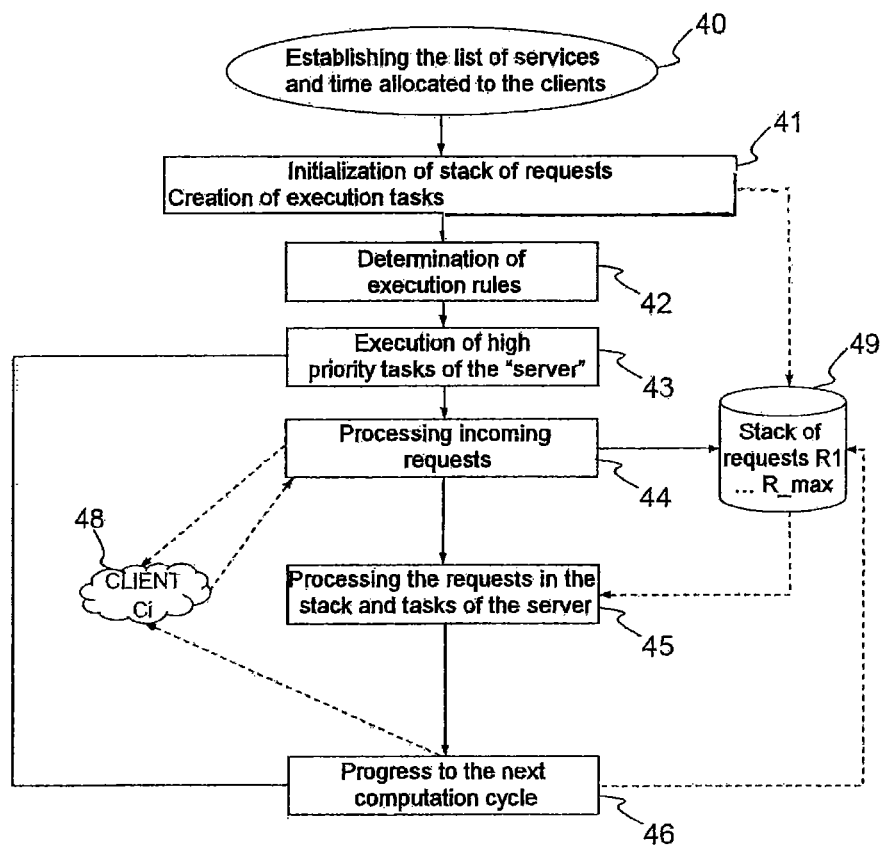
FIG. 4 shows possible different steps for the implementation of the method according to the invention.

FIG. 4 shows different steps possible for the implementation of the method according to the invention. The method comprises an initialization step 40. This step is carried out just once. The purpose of this initialization step is to determine the optimized average free time $T_{IdleOpt}$ that will be used by the other steps of the method. In this initialization step 40, there is created a task of high priority, of given duration, and its impact on maintaining the intrinsic performance requirements is measured. There are several possible ways of determining this duration.

Figure 5:
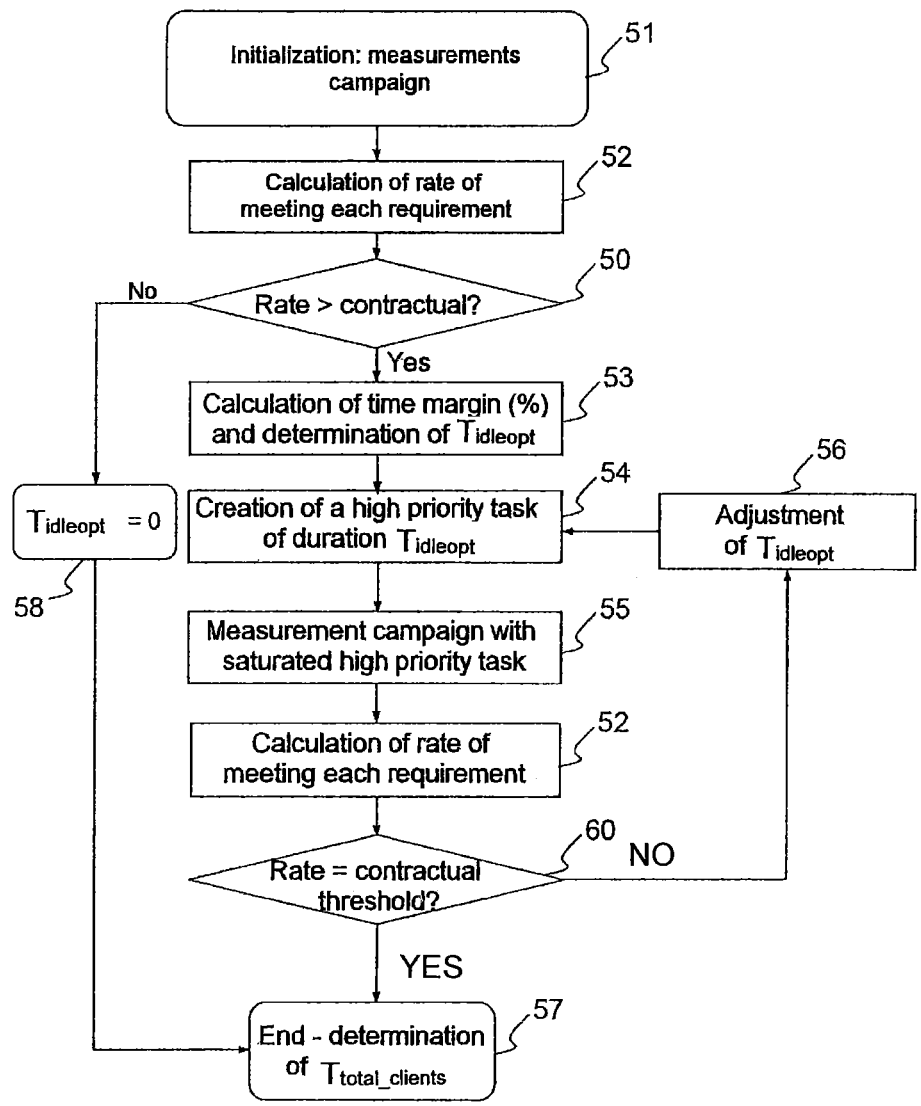
FIG. 5 shows an example of determination of the optimized average duration of the remaining time in a code execution cycle.

FIG. 5 shows an example of determination of the time $T_{IdleOpt}$. The sought duration is obtained by an iterative calculation whose steps are shown in FIG. 5.

A first step 51 consists in carrying out a campaign of measurements of the intrinsic response times of the system, over a set of representative scenarios, or by modelling the performances of the server system server. In this step of initialization of the computation, no high priority task is created. Sequences of processings in which contractual requirements are applicable are available on input. These requirements, the number of which is NB_contract, are characterized by:
  A processing sequence {E(i), S(i)} between 1 triggering event E(i) and an expected output S(i)
  A response time requirement T_contract(i)
  A probability of meeting this requirement P_contract(i).
This campaign measures:
  the response times from beginning to end of a sequence of processings (called an operational sequence), to which a contractual performance requirement applies,
  the total time of the IDLE remaining between the end of the processing and the due time of the contract T_contract(i).

Thus, for each sequence {E(i), S(i)} (i=1 . . . NB_contract), there are N_mes(i) measurements and/or functional operating tests and/or modellings. For each measurement j (j ranging from 1 to N_mes(i)), of a processing of a sequence {E(i), S(i)}, there is noted the response time obtained "T_mes(i,j)", corresponding to the time between the beginning and the end of the processing, and the total time of the IDLE "T_IDLE(i,j)".

The asynchronous tasks of the server use all of the possible available time per MIF, until completing the processing as shown in FIG. 6 which shows the result of a measurement j on a sequence {(E(i), S(i)}. The $N^{th}$ (shown as "MIF N" in FIG. 6) and last MIF (shown as "MIF FIN" in FIG. 6), referenced MIF N, corresponding to the end of the processing, therefore has a little of the IDLE available, the previous ones being full.

With each MIF having a duration T_MIF allocated to the asynchronous processings (i.e. on subtracting the time taken by the cyclic ones), the following is known for each measurement j of the sequence i:
  The number of MIFs N_MIF(i,j) for executing the processing is defined by N_MIF(i,j)=T_mes(i,j)/T_MIF, rounded up to the next integer.
  The number of MIFs corresponding to the expected response time is also known:

N_MIF_contract(i)=T_contract(i)/T_MIF

The next step 52 compares the rate of meeting the intrinsic performances requirements with respect to the contractual undertakings. In this step, it is a matter of checking the statistical distribution of the measured samples, with respect to the associated requirement. There are numerous techniques. For a real time system, where the passage through the processing sequences will be very great during the lifetime of the system, it is possible to use the properties of the law of large numbers to estimate the statistical law followed by each processing sequence. In order to do this, the method calculates the average duration and the standard deviation of the measurements of the first step 51, for each processing sequence of the measurement campaign, and determines the percentage of requirements met:

For any i of value from 1 to NB_contract, the following is calculated:
  Average duration for a sequence {E(i), S(i)}:

$$Tmoy(i) = \frac{1}{N\_mes(i)} \sum_{j=1}^{N\_mes(i)} T\_mes(i, j)$$

Standard deviation over the duration, for a sequence {E(i), S(i)}:

$$\sigma(i) = \sqrt{\frac{1}{N\_mes(i)} \sum_{j=1}^{N\_mes(i)} (T_{mes(i,j)} - Tmoy(i))^2}$$

The average time of the IDLE available:

$$Tmoy\_IDLE(i) = \frac{1}{N\_mes(i)} \sum_{j=1}^{N\_mes(i)} T\_IDLE(i, j)$$

If the number of measurements is sufficiently large, the law of large numbers can be used.

It makes it possible to affirm that the distribution of the measurements N_mes(i) converges in probability towards a law.

If the random samples are of the Monte-Carlo type, that is to say if the samplings where the random variables on input are independent and identically distributed, the "central limit theorem" shows that the distribution of the samplings is characterized by a particular law, a "normal law", of parameters Tmoy(i) and σ(i).

These same Monte-Carlo techniques make it possible to determine the minimum size of the sample "N_mes_min(i)" of measurements, assuring that the error e(i) between the estimated parameters Tmoy(i) and σ(i), and the reality Trep(i) and σrep(i) is less than a probability threshold Seuil(i):
  The threshold Seuil(i) follows the quantiles of the reduced normal law; thus for
    Seuil(i)=32%, q=1 (1 σ corresponds to 68% of the normal law)
    Seuil(i)=5%, q=1.96 (1.96 σ corresponds to 95% of the normal law)
    Seuil(i)=0.3%, q=3 (3 σ corresponds to 99.7% of the normal law)
  We have:

$$e(i) \leq \frac{q\sigma(i)}{\sqrt{N\_mes\_min(i)}}$$

Figure 7:
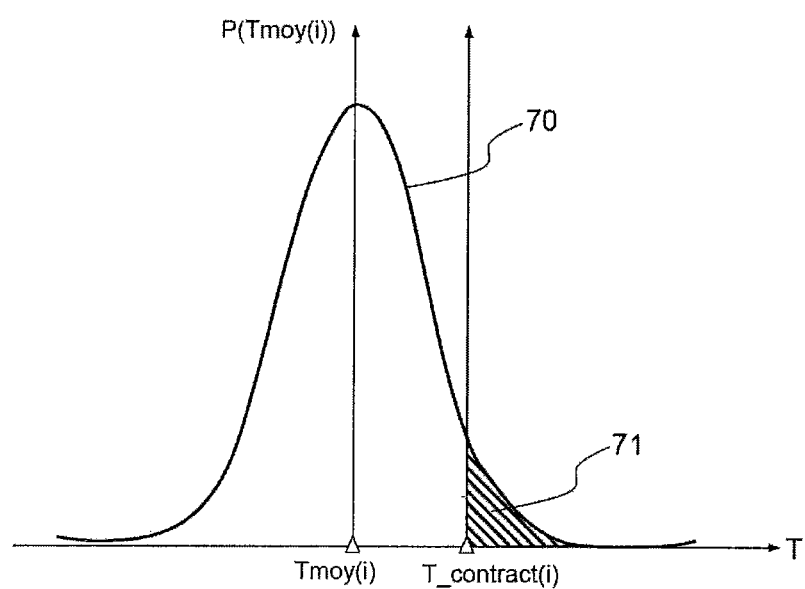
FIG. 7 shows a law for determining the probability of keeping to an operational requirement.

By plotting the normal law Tmoy(i) and σ(i) as shown in FIG. 7, it is possible to determine the probability of meeting the requirement P_mes(i), it is the upper half quantile at the time T_contract(i). The probability of non compliance corresponds to the area 71 situated to the right of the response time T_contract(i). The probability of compliance P_mes(i) is equal to the area to the left of T_contract(i).

A branch 50 of the method checks all of the performance requirements. For i ranging from 1 to NB_contract, the condition P_mes(i)>P_contract(i) is checked. The condition is met if all of the individual conditions are met. In this case, the process moves on to the next step 53 of the method.

If the condition is not met when $T_{Idleopt}=0$, there is no possible margin for the high priority task. This is the end of the method.

The third step calculates the time margin and determines the duration $T_{Idleopt}$. Since the probability of meeting the requirements is greater than the contractual requirements, the averages of the IDLE remaining for each sequence Tmoy_IDLE(i) are positive. They correspond to the unused time, making it possible to satisfy the response time requirement T_contract(i).

The "IDLE" that can be released for the sequence {E(i), S(i)} per MIF, is therefore equal to the average time of the IDLE for that sequence, distributed over the number of MIFs of the requirement contract of that sequence:

$$T_{Idle_{Opt}}(i) = \frac{Tmoy_{IDLE(i)}}{N\_MIF\_contract(i)}$$

If this time is blocked on each MIF, then for the sequence {E(i),S(i)}, Tmoy_IDLE(i) is theoretically distributed over all of the MIFs as illustrated in FIG. 8, with the theoretical measurement j obtained on a sequence {E(i),S(i)}. In FIG. 6, the $N^{th}$ MIF is shown as MIF N and the final MIF is shown as MIF FIN. In this figure, all of the available IDLE has been used for placing new high priority tasks 31. The processing time therefore becomes close to the contractual time, and therefore this, in turn, will increase the probability of non-compliance with the performance requirements. Taking account of incidences of a measurement over the average results observed for other sequences, it will be necessary to loop the steps of FIG. 5 until there is convergence on optimum durations.

The fourth step 54 carries out a campaign of measurements with a saturated high priority task. More precisely, in one embodiment, only one high priority task is created. The duration of this task will not therefore be able to exceed the shortest possible releasable time, that is to say the time corresponding to the most constrained sequence:

$$T_{Idle_{Opt}}=\min_{i\in[1;NB_{contract}]}T_{Idle_{Opt}}(i)$$

This embodiment can be a little too constraining, if the releasable values are very small for a given sequence and larger for the others. Advantageously, the method creates "NT" Tasks Task(1), Task(NT), and groups the processings {E(i),S(i)} by homogeneous releasable IDLE time:

That is to say:

$$T_{Idle_{Opt}min}=\min_{i\in[1;NB_{contract}]}T_{Idle_{Opt}}(i)$$

and $$T_{Idle_{Opt}max}=\max_{i\in[1;NB_{contract}]}T_{Idle_{Opt}}(i)$$

It is noted that $\Delta T=(T_{Idle_{Opt}max}-T_{Idle_{Opt}min})/NT$

Task(1) gathers the processings {E(k),S(k)} for k ranging from 1 to Nb_contract such that the average releasable time $T_{Idle_{Opt}}(k)$ is included between $[T_{Idle_{Opt}min}; T_{Idle_{Opt}min}+\Delta T]$ Task(i): gathers the processings {E(k),S(k)} for k ranging from 1 to Nb_contract such that the average releasable time $T_{Idle_{Opt}}(k)$ is included between $[T_{Idle_{Opt}min}+(i-1)*\Delta T; T_{Idle_{Opt}min}+i*\Delta T]$ Task(NT): gathers the processings {E(k),S(k)} for k ranging from 1 to Nb_contract such that the average releasable time $T_{Idle_{Opt}}(k)$ is included between $[T_{Idle_{Opt}min}+(NT-1)*\Delta T; T_{Idle_{Opt}min}+NT*\Delta T]$ Any other division can be carried out for grouping the processings, without this changing the inventive nature of the method.

The next step 55 carries out an identical campaign of measurements at the level of the scenarios played in step 51, but whilst blocking for each MIF a processing time per sequence {E(i),S(i)} equal to $T_{Idle_{Opt}}$ associated with the processing.

The second step 52 is restarted to then carry out the measurements on the response times obtained in this fifth step 55.

The second branch 60 of the method following the second repeated step 52 consists in checking the probability of meeting the response times by calculations identical to the first branch 50. For i varying from 1 to NB_contract, the condition P_mes(i)=P_contract(i) to within a tolerance (1% for example) is checked. The condition is met if all of the individual conditions are met. In this case, the process move on to an end step 57 that will be described below. In the contrary case, if it has not been possible to verify all of the conditions of the branch, the process progresses to a next step 56. The latter adjusts the average values as a function of the results obtained.

Two cases arise for each processing {E(i), S(i)}:
Case 1: A margin remains available for the processing. The IDLE margins are slightly increased for the sequence in question: $T_{Idle_{Opt}}(i):=k*T_{Idle_{Opt}}(i)$, where k is slightly greater than 1 (for example 1.1)
Case 2: There is no time for the processing. The margins of IDLE are slightly decreased for the sequence in question:

$$T_{Idle_{Opt}}(i):=k*T_{Idle_{Opt}}(i),$$

where k is slightly less than 1 (for example 0.9)

Step 56 then loops onto the fourth step 54 which will rearrange the sequences in the defined task or tasks. Steps 54, 55, 52, the second branch 60 and step 56 are reiterated until the conditions of the branch 60 are not met.

The last step 57 determines the minimum total time allocated to the clients "Ttotal$_{clients}$" per computing cycle of an MIF of duration T_mif. "Ttotal$_{clients}$" represents the releasable processing time of the server for the tasks 31.

If the $T_{Idle_{Opt}}$ are not zero, that is to say if a margin is available for the processings:

$$T\text{total}_{clients}=aT_{Idle_{Opt}}-b$$

"a" is a percentage (of between 0 and 100%), and "b" is a time margin. This guarantees that $$T\text{total}_{clients}\leq T_{Idle_{Opt}}$$

The values "a" and "b" are calculated to adjust the margin, if necessary. The method limits Ttotal$_{clients}$ such that:

$T\text{total}_{clients}\geq T_{min}$,(minimum time allocated to the clients)

In a preferred embodiment, which is generous to the client:
a=1 (i.e. 100%) and b=0, and $T_{min}=T_{Idle_{Opt}}$
In an alternative, which is minimalist for the client, it is possible to envisage values like:
a=0.75 (i.e. 75%) and b=10% of T_mif, and $T_{min}=1\% T_{mif}$
In an alternative which is dynamic for the client, it is possible to envisage values depending on the estimated short-term load of the "server":

a=f($T_{IdleOpt}$, load) and b=g(Tmif, load), and $T_{min}$=h(Tmif)

In fact, for most real time systems, it is known how to reliably determine the sequencing of the intrinsic functions of the system, related to an event. The events can also be classified into two types:

predictable event: the system monitors initiating parameters of an event. It knows how to estimate the occurrence of the event in question temporally (typically for an FMS, the system knows perfectly well how to estimate the occurrence of a sequence of a point in distance, altitude, time)

unpredictable event: generally this is matter of waking the "server" by an external system, or an elapsed timeout, or by a pilot interaction. The system does not know how to predict the occurrence of the event, but can at least estimate the associated computing load.

The method can therefore carry out a dynamic allocation of the values of adjustment of the available time according to a rule of the type:

| Type of event | CPU Time necessary to process the event | Time allocated to the clients |
| --- | --- | --- |
| Predictable, due at X ms (milliseconds) | Y ms | Intermediate mode: "generous mode" over X ms then "minimalist mode" during the response time for processing the Y ms in this mode, then "time mode" |
| Unpredictable | Y ms | "minimalist mode for the client" |
| Absence of known event | 0 ms | "generous mode for the client" |

Thus, when the FMS estimates an intrinsic load peak to come, it can temporarily reduce the high priority time slot allocated to the clients, because it knows that it will need to consume more of IDLE for its intrinsic needs.

After the time allocated to the clients, there is determined in the initialization step 40 the list of services available to the clients. The list comprises generic services, for example consultation services and modification services, and in-context services which depend on the application of the real time server. Examples of in-context services have been given previously for a flight management device. According to the invention, in order to further reduce the risk of having to modify the server and requalify it, the list of services that it offers is, as far as possible, made independent of the application context, in particular by:

the use of a generic syntax for the services, independent of the function executed;

the use of parameters and of lists to define the in-context function;

the use of lists that are not limited or are of sufficient size, for the parameters, in order not to modify the structure of the request for the service, even when the server has new functions or new parameters added to it;

the use of a neutral language, based on physics (conventional magnitudes of position, speed, acceleration, weight and time notably with regard to the avionic field for example), in order to have an interface that is as generic as possible.

An abstract modelling of the interface between the server and the clients is thus produced, called "server interface".

The interface is standard, that is to say it does not provide services for a client. A new client arriving must conform to this interface.

Each service of the list is "abstract" and characterized for example by:

the family to which it belongs
a list of parameters
option: a required priority level
option: a required accuracy
option: a class of processing time.

The parameters are specified at the time of the request by the clients from those defined statically by the "server interface".

A table of NB_Serv services is available at the output of this initialization step 40.

Thereafter, each service will be called "Serv(i)" where i=1 to NB_Serv.

For each service, the table contains:

The CPU processing time (not published in the "server interface")

The "guaranteed" response time (published in the "server interface").

Referring again to FIG. 4, once the initialization step is completed, the method executes the following steps, the initialization step no longer being executed for the subsequent operations, the services and the allocated time $T_{IdleOpt}$ having been defined. The initialization step could be used again in the case of evolution of certain parameters.

The first step 41 carries out the initialization of the stack of requests 49 and the creation of the execution tasks 31. The stack of requests 49 is initialized at 0. In this step, the method creates "TASKS" structures characterized by a number "NT" of execution tasks, each task i, with i ranging from 1 to NT, being characterized by at least:

an identifier task(i);
a priority level P_task(i);
A duration T_task(i).

These are tasks optimized according to the initialization step 40. The case NT=1 corresponds to the illustration of task 31 in FIG. 3.

The "server" already contains its list of tasks Server_Tasks(i) arranged in their order of priority P_Server_Tasks(i) for i ranging from 1 to NB_Server_Tasks. Typically, the tasks with highest priority correspond to the tasks or cyclic processings 21 and the task of least priority is the task Server_Tasks(NB_Server_Tasks) corresponding to the IDLE 29.

The priority levels are used to sequence the execution of the tasks:

$$P\_Task(i) <> Ptask(j) \forall i <> j, (i,j) \in (1 \ldots NT) \times (1 \ldots NT)$$

$$P\_Task(i) <> P\_Server\_Tasks(j),$$

$$\forall (i,j) \in (1 \ldots NT) \times (1 \ldots NB\_Server\_Tasks)$$

The tasks allocated for the client can be interspersed in the "server" tasks or regrouped. In a context of implementation using the ARINC 653 standard and its dynamic task priority modification function, it is preferable that they are grouped to have real time control.

The duration T_Task of each task "Task(i)" is adjusted so that:

$$\Sigma_{i=1}^{NB\_Tasks} T\_Tasks(Task(i)) = T_{totalclients}$$

In the case of dynamic durations, it is necessary to ensure that each elementary task has a minimum duration Tmin. This duration cannot be greater than $T_{total_{clients}}/NT$ whilst satisfying $\Sigma_{i=1}^{NB\_Tasks} Tmin(i) \leq T_{total_{clients}}$ In an alternative specific to the resources with redundancy, corresponding to a case where there is more than one physical instance of the "server", the "TASKS" structure created by the method can be distributed over the different physical resources, the different resources then sharing the NT tasks.

In another alternative, the method creates as many instances of "TASKS" as there are resources, there are therefore NT tasks per resource.

In a third alternative, the method creates a number of tasks per intermediate resource between the above two alternatives such as illustrated by the example defined by the following table where each resource has a number of tasks between 1 and NT:

| Task | Resource 1 | Resource 2 | ... | Resource i | ... | Resource NR |
|---|---|---|---|---|---|---|
| Task(1) | X | X | | | | |
| Task(2) | | X | | X | | X |
| ... | X | | | | | |
| Task(i) | | X | | | | X |
| ... | | | | X | X | |
| Task(NT) | X | | X | | X | X |

The second step 42 determines the rules of execution of the tasks. This step associates:
- the "execution tasks"
- the available resources, by creating rules.

At the output there are tables for the allocation of the services to the tasks, for example according to the following table:

| Task | Service being executed on the task |
|---|---|
| Task(1) | Serv(i), Serv(j) ... |
| ... | |
| Task(i) | Serv(k), Serv(n) ... |
| ... | |
| Task(NT) | Serv(p), Serv(q), ... |

It is for example possible to allocate the services to the tasks by their processing times, as defined in the initialization step 40, that is to say to put the services consuming most onto a task to which a more significant execution time will be allocated, and the individual services onto a task of shorter duration. The services can also be allocated to tasks by nature (modification, consultation), or by priority.

In an alternative, tasks can be allocated to the clients as a function of their priority as shown in the following table:

| Task | client being executed on the task |
|---|---|
| Task(1) | Client_x |
| ... | ... |
| Task(i) | Client_y |
| ... | ... |
| Task(NT) | Client_z |

On the other hand, given that neither the number of clients which connect nor their natures are known a priori, the method comprises:

Either a static configuration table, on start-up making it possible to allocate the clients to the tasks though their physical port (that is to say through their physical or logic interface: the "Virtual Link" concept in aeronautics which defines the wiring between systems)

Or an addition in the signature of the requests, which allows a sequencing task to allocate them to a client task. A new client can then declare itself with a standard profile (frequency of requests, types of services requested ... ).

The method, in a preferred implementation, can in all of the cases mentioned above define the Task(1) (the client task having highest priority) as being the sequencer of the requests arriving at the "server", that is to say placing them in the stack of requests 49 with the correct allocation of task upon which it will be executed. As a result it will have the highest priority of all of the Task(i).

The method can alternatively define a stack of requests per task, the function of the task of order 1 (Task(1)) will then be to fill the different stacks.

The method can, in an alternative, select the resources onto which the services or the clients will be connected.

Any other combination is possible, without this limiting the extent of the invention.

In the third step 43, the priority tasks of the server are executed. More precisely, this step carries out the conventional internal calculations of the server, for its own needs, of high priority, which are generally the cyclic tasks 21.

All of the server tasks satisfy the following relationship:

$$P\_Server\_Task(Server\_Tasks(j)) > P\_Task(Task(i))$$

$$\forall (i,j) \in (1 \ldots NT) \times (1 \ldots NB\_Server\_Tasks)$$

It is in this third step 43 that the processing of an MIF begins, this processing beginning with the execution of the priority tasks, in particular of the cyclic tasks 21, to which the third step 43 is dedicated.

In the alternative of dynamic allocation of the time allocated to the clients of the first step 41, the third step 43 carries out, for example, the calculation of each estimated predictability of an event to arise, and of the estimated processing load for a failed event.

Figure 9:
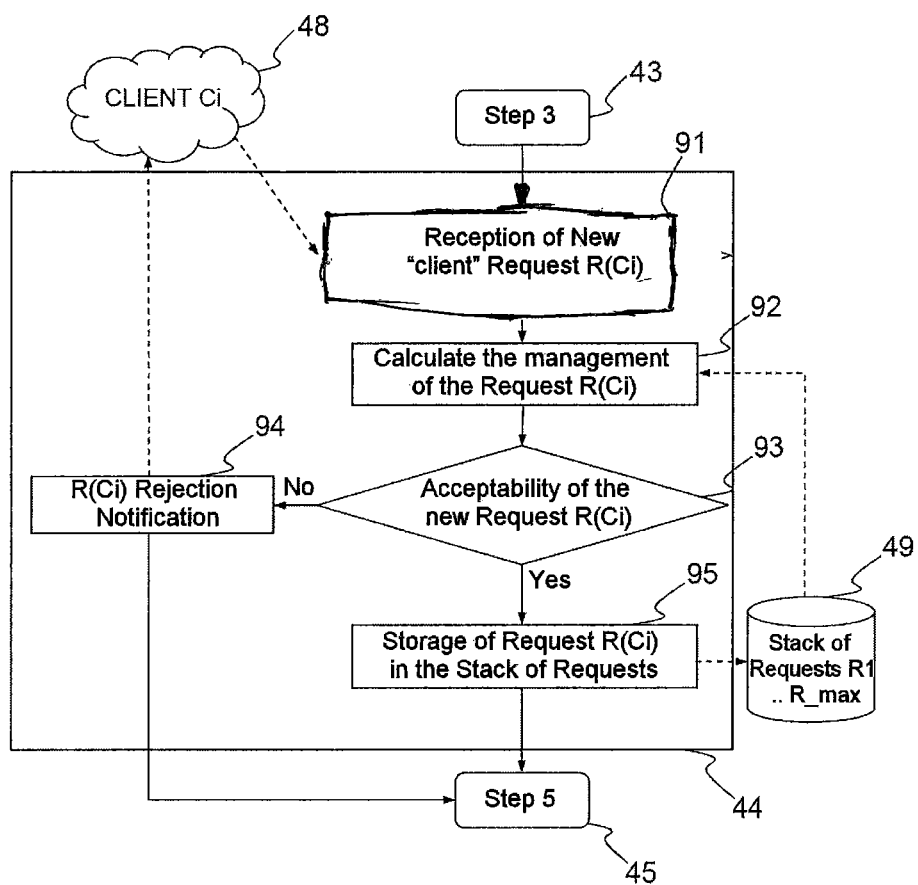
FIG. 9 shows an example of processing asynchronous incoming requests sent by the clients.

The next step, the fourth step 44, continues the processing of the MIFs by processing the incoming asynchronous requests sent by the clients 48. It comprises several sub-steps illustrated by FIG. 9.

The first sub-step 91 consists of retrieving a new request Ri coming from a client Ci. This very short retrieval step is executed in the task Task(1) in a preferred implementation. In an alternative, this management could be carried out by the cyclic processing 21 of the server.

The request is managed in the next step 92 if the system can manage it within the given time, that is to say if the response time necessary for processing the request is compatible with the minimum possible response time, in the task Task(i) to which it has been allocated, starting from the initial MIF, this management being:

A function of the starting MIF of the calculation of the request Ri

A function of the time allocated for this request T_Task (Task(i))

A function of the time allocated for this request in remaining releasable IDLE time In an Arinc 653 implementation, the task which is executed on the IDLE (that is to say on Server_Tasks (NB_Server_Tasks) is always the one of highest priority that has not completed its work on its task;

In another implementation, the method could divide the IDLE into the same number of tasks as NT and allocate a time slot to each of the remaining client tasks.

If the stack of requests 49 is full, a rejection notification with the status 'Stack full' is issued for example.

In a "multi-resources" alternative, this distribution task is for example executed on one of the resources which distributes the requests over different resources, as a function of the load on the said resources. Thus if a resource i is busy processing requests and it cannot absorb a new request in its stack without guarantee of response within the given time, the supervision system addresses a less loaded resource j, if it exists.

The third sub-step 93 consists in sending the result of the preceding sub-step 92:
either to the stack of requests 49 via following sub-step 95,
or to another sub-step 94 of notification of rejection to the client 48, when for example the due time requested by this new client is not compatible with the cumulated duration of the processings already present and accepted in the stack.

This sub-step 94 is a protocol service with the client for returning a status of refusal of its request Ri and possibly a sub-status indicating for example a processing that is too long, a full stack or another state.

If the request Ri is acceptable, the sub-step 95 sends a write request to the stack of requests 49. In a possible embodiment, the incoming requests are arranged in FIFO manner in the stack.

Preferably the stack 49 is unique, but there can be one stack per task in an alternative implementation.

In sub-step 95, the following is therefore written into the stack:
the service Serv(i) to be executed in order to meet the request Ri, in the correct position in the stack;
optionally, the client Ci at the source of the request;
optionally, the requested processing time;
optionally, the execution resource or resources chosen in the "multi-resources" alternative.

In the multi-resources alternative, the stack can be managed by the resource that supervises all of the requests. Advantageously, a local copy of the stack on all of the resources, or making the stack common to all of the resources, can be effected in order to avoid reliability problems, in the case for example where the supervision resource breaks down.

The fifth step 45 consists in executing, for each resource:
the different requests in the stack of requests 49 on the different tasks to which they are allocated;
the remaining server tasks;
then, if CPU time remains available on the IDLE task, and therefore after execution of the calculations of the server, executing the remaining tasks according to a priority criterion.

Figure 10:
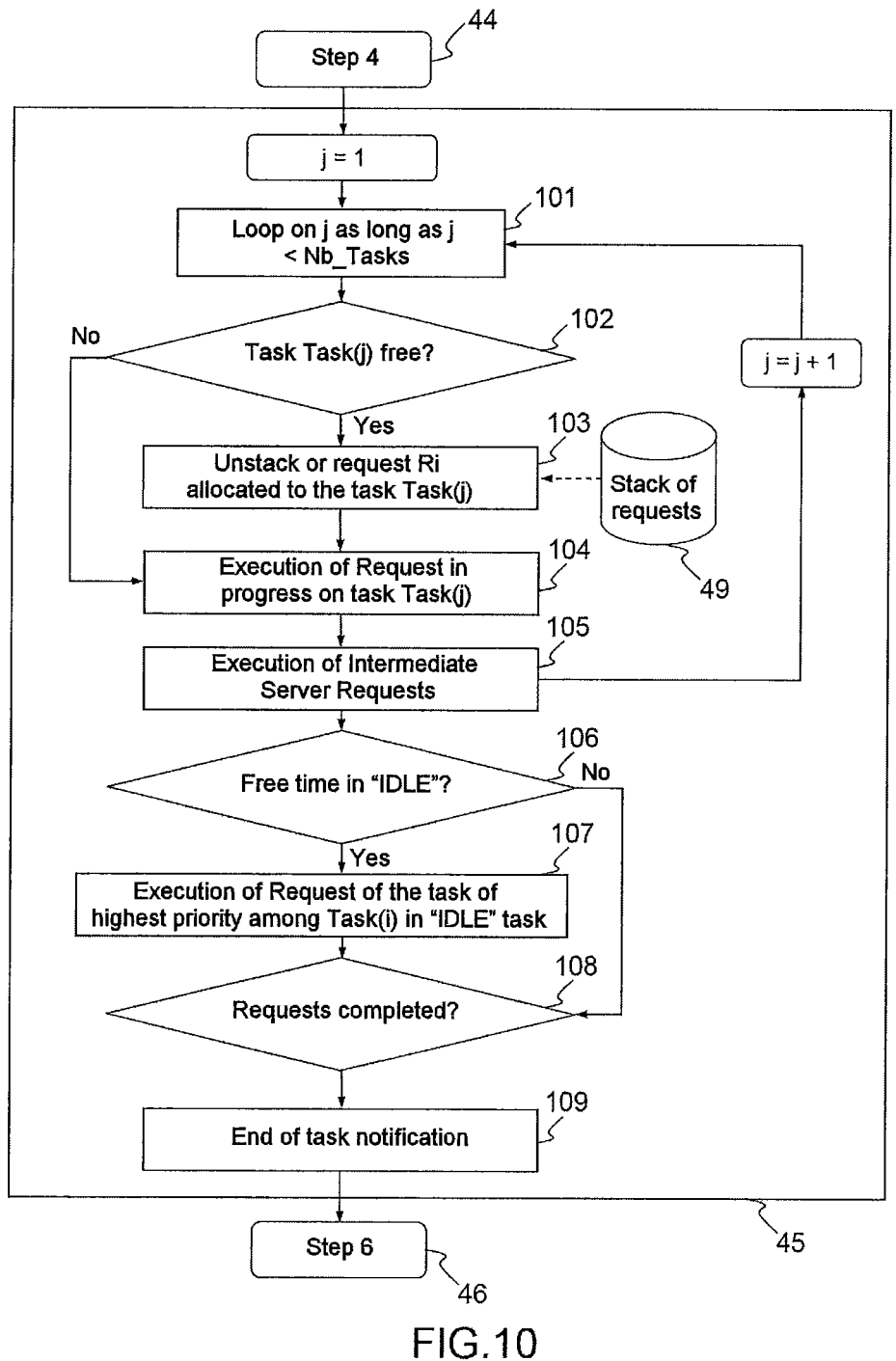
FIG. 10 shows an example of execution of a step of the method according to the invention making it possible to process the tasks interspersed between client tasks and server tasks.

FIG. 10 shows an example of execution of the fifth step 45 notably making it possible to process the tasks interspersed between client tasks and server tasks. In a preferred implementation, the task Task(1) is used for filling the stack 49 in the fourth step 44. It can also be used for processing the unstacking of the highest priority tasks. For the processing of the requests in the stack illustrated in FIG. 10, the fifth step 45 comprises sub-steps carried out iteratively.

The method loops, between the first sub-step 101 and the fifth sub-step 105, over the client tasks. The first step 101 takes into account the request of order j, j varying from 1 to Nb_tasks and expressing the depth of the stack, if the requests are arranged in FIFO manner.

In the second sub-step 102, the method first checks if the task of order j, task (j) is free, or being used by the execution of a request that had been accepted in a previous cycle, and is not complete;

If the task is free, the method checks in the third sub-step 103 if it can unstack a request to be allocated to the client. If this is the case, it unstacks the request Ri placed in the highest priority position in the stack, this request becoming the new request to be executed during task Task(j) in the following sub-step 104;

If the task is free but there is nothing to execute (no request to be unstacked), the task of this sub-step 104 immediately releases control to allow the next step to be executed by moving on to the next sub-step 105.

This next sub-step 105 consists in checking if there are asynchronous tasks of the server of priority included between those of the client task in progress Task(j) and the next Task(j+1), if this is the case these server tasks are executed. This process can be expressed as follows:
i exists such that $P\_Server\_Task(Server\_Tasks(i)) > P\_Task(Task(j+1))$ where $(i,j) \in (1 \ldots NT-1) \times (1 \ldots NB\_Server\_Tasks)$;
The intrinsic tasks of the server are looped over 105 as long as this equation is true;
then the process loops back to the next client task (j=j+1) by returning to the first sub-step 101 of the loop of execution of the client tasks interspersed in the server tasks.

When all of the tasks of the execution loop are completed, in a next sub-step 106 it is checked if free CPU time in the IDLE task remains for executing the remaining client tasks. If no free time remains, the fifth step 45 is ended 108. If free time remains, the tasks are executed according to a priority criterion, the task of highest priority being executed in total or in part, depending on the available time. When the allocated time is consumed or the execution of the task is completed, the fifth step 45 is ended. An end of task notification is issued 109.

The sixth step 46 manages the move to the next cycle (next MIF), a cycle being carried out from the third step 43 to the fifth step 45. In this step 46, if a processing of the fifth step 45 for an external client is completed (information transmitted by the end of task notification issued (109), the system:
retrieves the data of the request Ri from the stack of requests;
notifies the corresponding client Ci with the result of the calculation;
Withdraws the request from the stack of requests.

This processing is carried out for each of the processings which have been completed during the fifth step 45. There can in fact be several completed processings, this information being transmitted by the notification 109.

A cycle 43, 44, 45 corresponds to the processing of an MIF as illustrated in FIG. 8. The cycle is repeated as long as the tasks Task(i) created in the first step 41 are not all executed.

The cycle 43, 44, 45 notably shows that over the processing of an MIF:
The cyclic tasks 21, or high priority server tasks, are executed first;
The client tasks Task(i) are executed next, for a maximum duration T_Task(i), the server then not always having the time to complete the client task Task(i) in progress;

The intrinsic tasks of the server are executed next, the intrinsic tasks generally being the asynchronous tasks of a real time system but can be cyclic tasks of lower priority than the high priority tasks of the server;

And if time remains in the MIF, that is to say that the intrinsic tasks of the server have not consumed all of the duration of the MIF, then the client task task(i) is executed in the IDLE, that is to say in the time remaining in the MIF.

Advantageously, via the creation of a task Task(i) of intermediate priority, executed over a duration $T_{IdleOpt}$ previously determined on the basis of the performance of the system, the invention makes it possible:

To allocate computation time to third party clients (or external clients), in a guaranteed manner;

To satisfy the response times of the server system with a guaranteed probability of meeting requirements;

To always be able to give a reliable prior response of acceptance or refusal to deal with a request.

It follows that:

The server performances remain guaranteed, however many existing or future clients call upon it, since an "over-demand" is executed after the server has completed its intrinsic calculations;

The structuring of the services makes it possible to provide upward compatibility since an abstract syntax has been used, making it possible to put the data and services of the server in the form of parameters.

In a preferred embodiment, notably in the avionic field for flight management, the initialization step 40 and the first step create only one single client task 31 separate from the intrinsic tasks of the server. The list of tasks is therefore replaced by the single task Task(1), NT being equal to 1 as shown in FIG. 3. In the second step 42, all of the client processings are then executed in the single task Task(1) 31. In the first sub-step 91 of the fourth step 44, the requests are made in this single task Task(1) and the fifth step 45 is carried out in this task Task(1). The sub-step 105 no longer has any sorting to do since there is only one single task Task(1): it therefore executes the intrinsic tasks of the server in one block.

This preferred implementation can advantageously be integrated in a system based on the ARINC 653.

It is also possible to make provision that for the initialization step 40 and for the first four steps 41, 42, 43, 44, the method creates one task per resource, and all the processings are carried out on all the resources. There is therefore no optimized task allocation between resources.

Still in a preferred embodiment, in the preliminary step 40, there is the expression:

$$T\text{total}_{clients} = aT_{IdleOpt} - b$$

That is to say that the time allocated to the clients per computing cycle of an MIF is equal to the optimized average duration of the IDLE $T_{IdleOpt}$.

Figure 11:
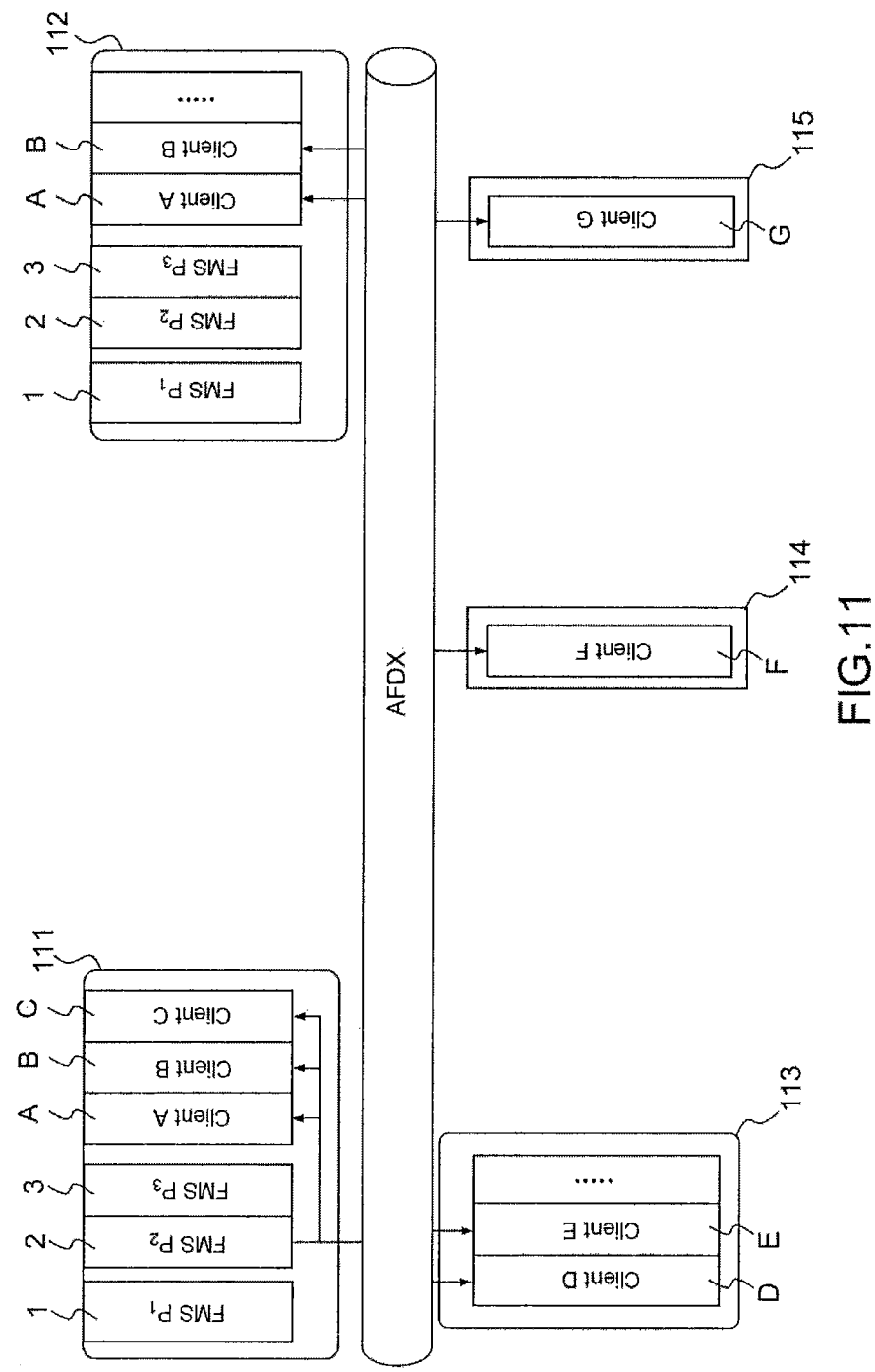
FIG. 11 shows an example of physical representation of clients in the case of application to an FMS system.

FIG. 11 shows an example of physical representation of the clients in the case of application to an FMS system notably of the type described with reference to FIG. 1. The server is a flight management application. The system comprises for example two physical modules 111, 112 forming the physical resources each notably comprising a server. In this example, the server is a flight management application.

As the system has redundancy, the two physical resources carry out the same functions. The identified and known clients 1, 2, 3 are hosted in the physical modules 111, 112, which are the physical modules of the FMS. The external clients, not previously identified, can either be applications hosted in the physical modules 111, 112 hosting the server, or applications distributed in the aircraft in other physical modules 113, 114, 115. In the example shown in FIG. 11, three external clients A, B, C are hosted in the physical module 111, and 2 external clients A and B are hosted in the physical module 112. For this purpose, the clients A, B, C have for example internal RAMs in the modules as physical resources, the application codes of the clients A, B, C being copied into the internal RAMs of the module to which they are connected (111 for A,B,C and 112 for A,B). Other external clients D, E, F, G communicate with the physical modules by an avionic full duplex Ethernet ("AFDX") link, the access occurring by standardized protocols, Aeronautics Radio, Incorporated ("ARINC") 653 in the example shown in FIG. 11. The clients can be among the following applications:

a Human Machine Interface ("HMI"), an integrated Human System Interface ("HIS"), an Aircraft Interface Device ("AID");

a Communication Management Unit ("CMU");

a Traffic Collision Avoidance System ("TCAS");

a Terrain Awareness and Warning System ("TAWS");

a Weather Information Management System ("WIMS") or a Weather Radar ("WxR");

an Electronic Flight Bag ("EFB");

a tablet;

an Fuel Quantity Management System ("FQMS");

an Automatic Pilot ("AP");

a Flight Warning System ("FWS"); and

In Flight Entertainment ("IFE")

these applications having been presented during the description of the FMS system shown in FIG. 1. Other client applications are of course possible.

With reference to the initialization step 40, the FMS services or functions can be abstracted as described below.

Three large families of services can be defined in order to classify all of the services of an FMS according to the AEEC ARINC 702A standard.

The geographic data consultation services (navigation data & dynamic magnetic variation), allowing the clients to search for geographic information or magnetic variation at a point of the globe;

The aircraft performance consultation services (aircraft characteristics & performances) making use of the lateral trajectory 120 and prediction 140 functions and the performance database 150, this family being composed of the following list:

The characteristic limits of the aircraft (for example: min and max weights, certified altitude ceiling . . . )

Takeoff and landing speeds (called characteristic speeds)

Flight envelope calculations (max speeds, stall speeds, max roll . . . )

Integration computations according to the chosen aircraft modes (climb of X feet at constant thrust, descent at specified air slope, turn at imposed angle . . . )

Package calculations (for certain FMS systems, simplified performance calculations can be defined in the PERF DB, where the required accuracy is less)

the "flight management" services (flight management)

consultation of the status of the aircraft (position, speed, statuses of the systems connected to the FMS, like the status of the engines, the modes engaged by the automatic pilot, etc. . . . .

consultation and modification of flight plan and of 5D trajectory consultation and modification of the initialization of the flight data (input of takeoff speeds, of cruise altitude, of the meteorological prediction, of the fuel consumption modes . . . ).

Taking for example the "flight management" family, the typical services are notably:

Administration services making it possible to copy all or part of a departure flight plan to a destination flight plan, to delete a flight plan, to exchange two flight plans, etc. . . . .

"Initialization" services making it possible to initialize a route and its principal parameters "Departure" services for entering the departure procedures "Arrival" services for entering the arrival procedures "Airways" services for entering the list of "airways" (sky routes)

"Alternate" services for entering and checking the information on the alternate airports "DIR TO" service for carrying out a DIRECT TO to a waypoint Service for entering vertical constraints (altitude, speed, time)

"HOLD" services making it possible to enter the racecourse holding patterns

"Meteo" services making it possible to enter the wind and temperature information during the different flight phases "Location" services which make it possible to know the positioning of the aircraft with the different sensors, the navigation accuracy, the beacons used for the navigation, etc. . . . .

"Route Summary" services making it possible to display a summary of the Route or of the mission.

In the geographic data consultation Services, three types of services can be listed:

The "Data" services for displaying the data relating to elements of the navigation database: a service for the stored Routes, a service for the "waypoints", a service for the "radio beacons", a service for the "airports"

The "Status" services which give the configuration of the aircraft (Part Number of software products and databases, . . . ). There can be about ten Services of this type.

The "Weight management" services making it possible to enter and check weights (empty weight, fuelled weight) and the centre of gravity.

Figure 12:
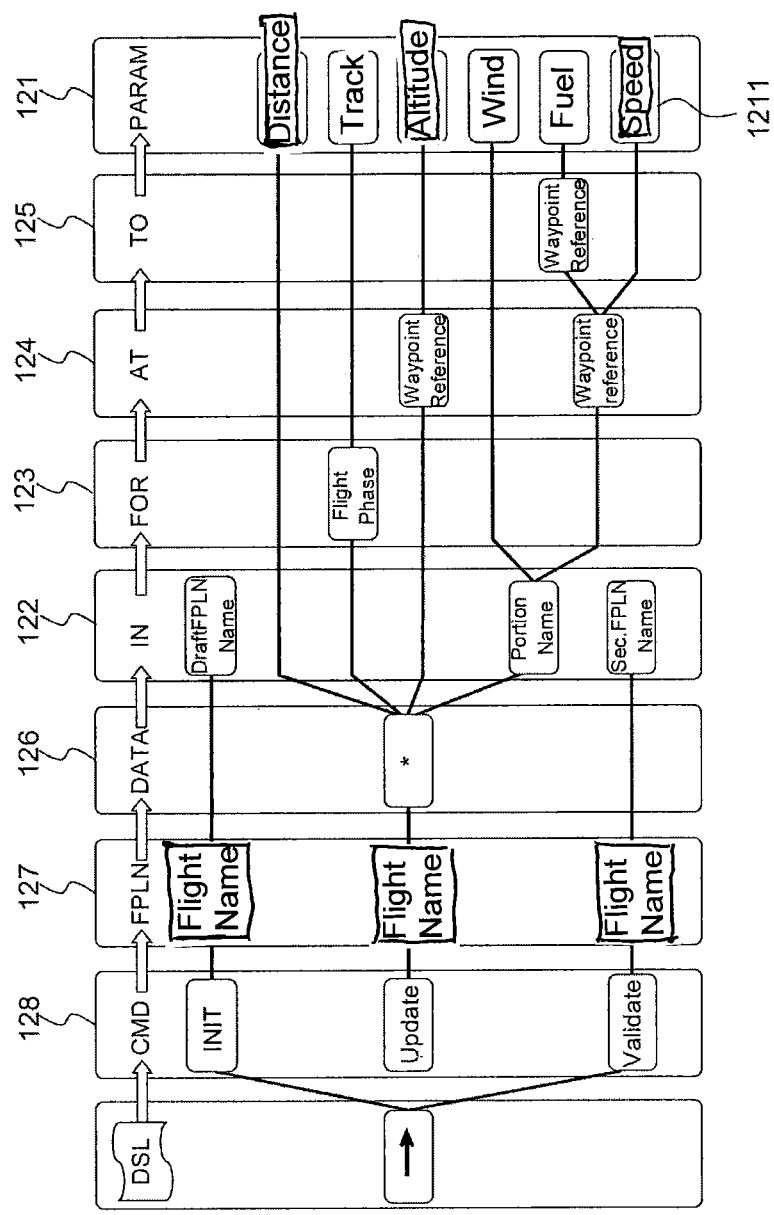
FIG. 12 shows an example of language applied to the services of the "flight management" family.

FIG. 12 shows an example of language applied to the services of the "flight management" family. It comprises three high level commands which make it possible to make all of the services of the "flight management" family individual.

The parameters PARAM 121 are the individual elements 1211 (physical magnitudes of the FMS context) handled. Typically:
distance between elements
track (angles with respect to north)
altitude
speed
fuel
passing time
wind,
or even other items of information such as:
the quality of the GPS signal at the point,
the temperature,
the navigation requirement,
the max and min achievable time limits,
the constraints of time/speed/altitude . . . ).

The IN 122, FOR 123, AT 124, TO 125 operators are typical of the "flight management" services in the FMS context. They make it possible to:

specify a destination flight plan for revision, among the different flight plans managed by the FMS (In), among at least the "active" flight plan, the "temporary" flight plan and the "secondary" flight plan specify a particular flight phase (For), among at least the "pre-flight", "takeoff", "climb", "cruise", "descent" and "approach" phases specify a revision on an individual element (leg or waypoint) of the flight plan, via AT (the revision is applied on the element) and TO (la revision ends at the element).

The DATA operator 126 is central in the method. It is the transcription of the "revisions" of the FMS context, available for the clients, by a "data" view (the data or the data structure to which the control will relate). For the "flight management" services, it is possible to define (non-exhaustive list) the flight plan elements coming from the navigation database 130 or created by the pilot, such as described in the AEEC ARINC 424:

Airport
Runway
Departure procedure (SID, SID ENROUTE), including decision altitudes (throttle back altitude, end of takeoff altitude . . . )
Arrival procedure (STAR, VIA, APPROACH), including the beam capture altitude . . .
Break-away and diversion procedure (Alternate)
Cruise FL (cruise altitude)
Airways (highways in the sky)
Waypoints (Lat/Long points)
Constraints relating to the waypoints (Altitude, speed, time, cruise Steps)
Points created by other points (ATO, PBD, PBPB, Lat/Long)
Overfly (constraint to fly over the point)
Constraints on the trajectory (RNAV, RNP, RVSM)
Racetrack holding patterns and turn around at a point procedures
Offset (lateral or vertical offset with respect to the trajectory)
Flight plan (complete structure)
2D Trajectory (list of trajectory segments joining the flight plan elements)
3D Trajectory (2D trajectory+altitude variation)
4D Trajectory (3D trajectory+speed or time evolution)
5D Trajectory (4D trajectory+fuel consumed)
Meteorological data on the points or flight phases
and also the aircraft performance elements (coming from the performance database 150), notably:
Engines
Weights
Takeoff configuration (V1, V2, V3, Flaps conf, Trim . . . )
Landing configuration.

The FPLN operator 127 indicates the flight plan to which the revision will relate among at least the "active" flight plan, the "temporary" flight plan and the "secondary" flight plan.

Thus, with this structuring, three CMD commands 128 can be defined for encapsulating all of the "flight management" services:

The INIT and VALIDATE services cover the administration services of the flight plan The UPDATE service covers all of the other services (revisions).

The structuring of the services, defining the sequencing of the services and their interactions, shown in FIG. 12, uses an abstract syntax 128, 127, 126, 122, 123, 124, 125, 121 making it possible to put the data and the services of the server in the form of parameters. Advantageously, a standard client interface is obtained, based on parameters, independent of the specific features of the services, notably of the specific features of the field of application, thereby ensuring an upward compatibility of new services.

The invention claimed is:

1. A method for the execution of services in real time by an application called "server" for at least one application called "client", comprising a preliminary step of establishing a list of services of the server available for the said at least one client, in which step there is determined a releasable processing time by the server for the said at least one client per code execution cycle called a minor frame (MIF), the said method creates on start-up:

a number of (NT) client tasks (Task(i)) for the said at least one client each one having a priority of execution level (P_task(i)) and an allocated average duration of execution (T_task(i)), NT being equal to or greater than 1, a total duration of said NT client tasks being less than or equal to the said releasable processing time, wherein the releasable processing time is equal to:

$$a \times T_{Idleopt} - b$$

where "a" is a coefficient between 0 and 1, and b is a time duration between 0 and 10% of T_mif, wherein T_mif is a duration of the MIF, $T_{Idleopt}$ being an average duration of the free time remaining per MIF cycle to keep to the response times of an intrinsic task of a plurality of intrinsic tasks of the server within a predefined probability;

execution rules associating each of the said tasks (Task(i)) with at least one service (Serv(k)) of the said list;

then, during each MIF cycle, the said method executes the said services on their associated tasks, a task being executed according to its level of priority and for a time at most equal to its allocated average time of execution (T_task(i)), a non-executed part of a service being executed after the plurality of intrinsic tasks of the server, wherein the non-executed part is defined as one or more client tasks not yet executed.

2. The method according to claim 1, wherein, during each MIF cycle, the said client tasks are executed after a plurality of high priority tasks of the server and before the intrinsic tasks of the server.

3. The method according to claim 1, wherein if the number of clients is greater than 1, a task (Task(1)) supervises a plurality of asynchronous requests sent by the clients and initiates the processing of the associated services on the server, either on this same task (Task(1)), or on a task of different priority, as a function of an available time of the server within the MIF cycle.

4. The method according to claim 1, wherein the method determines a maximum time necessary for executing a service of the server for a client on the associated task, knowing its average processing time per cycle, the said maximum time being transmitted to the said client.

5. The method according to claim 1, wherein a maximum time of execution is imposed, the execution of the service is accepted or refused as a function of the maximum time necessary for completing the execution of the said service and of the imposed maximum time of execution.

6. The method according to claim 5, wherein the imposed maximum time of execution is provided by the client requesting the said service.

7. The method according to claim 5, wherein the said imposed maximum time of execution is predetermined by configuration of the server.

8. The method according to claim 1, wherein the average time of execution allocated per MIF cycle (T_task(i)), is defined individually for each client, irrespective of the associated service.

9. The method according to claim 1, wherein the task (task(i)) is defined for each service.

10. The method according to claim 1, wherein the task (task(i)) is defined for each client.

11. The method according to claim 1, wherein the average time of execution allocated per MIF cycle is variable as a function of the server's own execution resources.

12. The method according to claim 1, wherein a=1 and b=0.

13. The method according to claim 1, wherein the said available services are structured with the help of an abstract syntax to put the data of the server and of the said available services in parameter form.

14. The system according to claim 1, wherein the clients are external applications distributed in other physical modules and communicating with the server via a network protocol.

15. The system according to claim 1, wherein the server is a flight management application.

16. The system according to claim 15, wherein the clients are included in the following list of applications:

a Human Machine Interface (HMI);
a Human System Interface (HSI);
an Aircraft Interface Device (AID);
a Communication Management Unit (CMU);
a Traffic Collision Avoidance System (TCAS);
a Terrain Awareness and Warning System (TAWS);
a Weather Information Management System (WIMS);
a Weather Radar (WxR);
an Electronic Flight Bag (EFB);
an Fuel Quantity Management System (FQMS);
an Automatic Pilot (AP);
a Flight Warning System (FWS); and
an In Flight Entertainment (IFE).

* * * * *